(No Model.) 2 Sheets—Sheet 1.

A. RUNSTETLER.
GRAIN DRILL.

No. 308,327. Patented Nov. 18, 1884.

Attest
Jos. W. Sims
A. Gluchovsky

Inventor
Andrew Runstetler
by Wood & Boyd
his Attorneys (No Model.) 2 Sheets—Sheet 2.

A. RUNSTETLER.
GRAIN DRILL.

No. 308,327. Patented Nov. 18, 1884.

Attest
Jos. W. Sims
M. E. Millikan

Inventor
Andrew Runstetler
by Wood & Boyd
his Attorneys &c

United States Patent Office.

ANDREW RUNSTETLER, OF DAYTON, OHIO, ASSIGNOR TO THE FARMERS FRIEND MANUFACTURING COMPANY, OF SAME PLACE.

GRAIN-DRILL.

SPECIFICATION forming part of Letters Patent No. 308,327, dated November 18, 1884.

Application filed March 17, 1884. (No model.)

*To all whom it may concern:*

Be it known that I, ANDREW RUNSTETLER, a citizen of the United States, and a resident of Dayton, in the county of Montgomery and State of Ohio, have invented certain new and useful Improvements in Grain-Drills, of which the following is a specification.

My invention relates to an improvement in grain-drills, which will be fully set forth in the description of the accompanying drawings.

Figure 1:
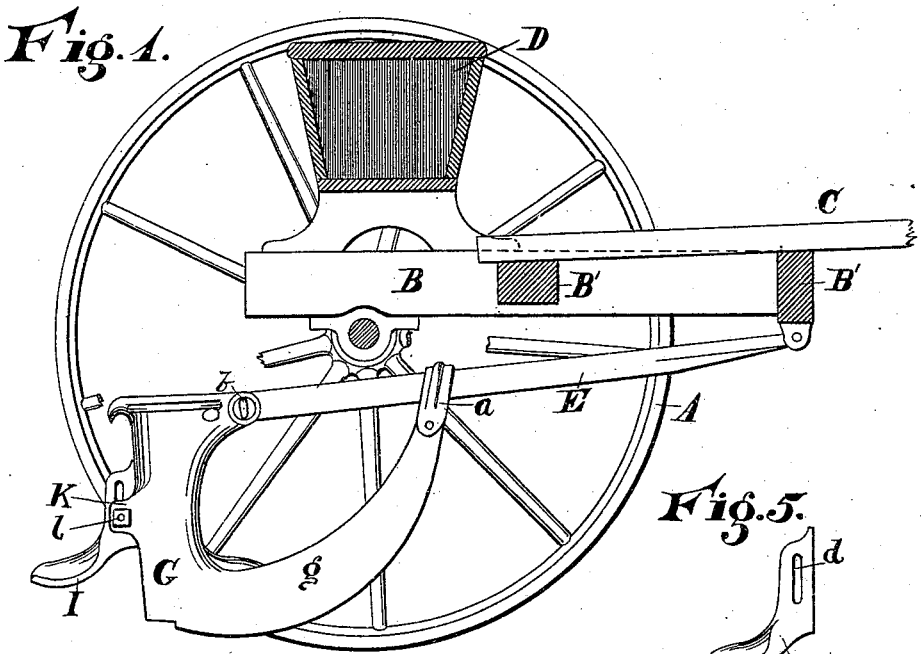
Figure 5:
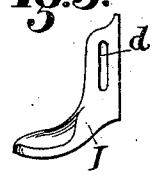
Figure 2:
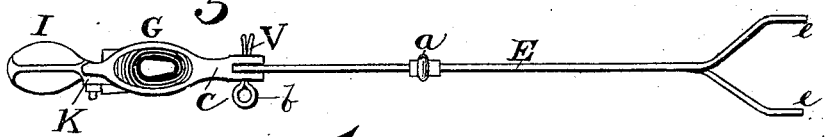
Figure 3:
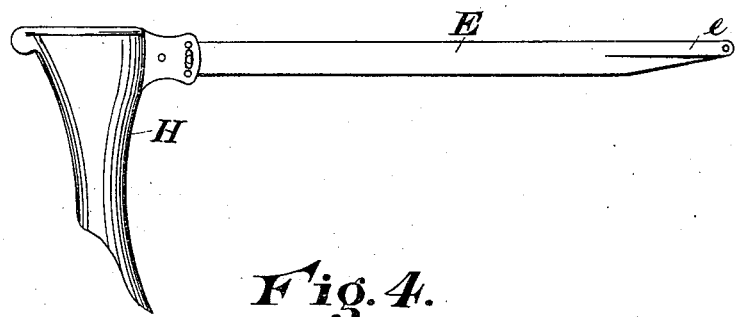
Figure 4:
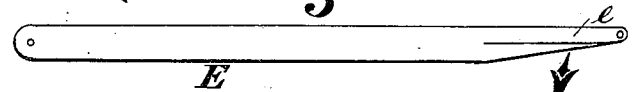
Figure 6:
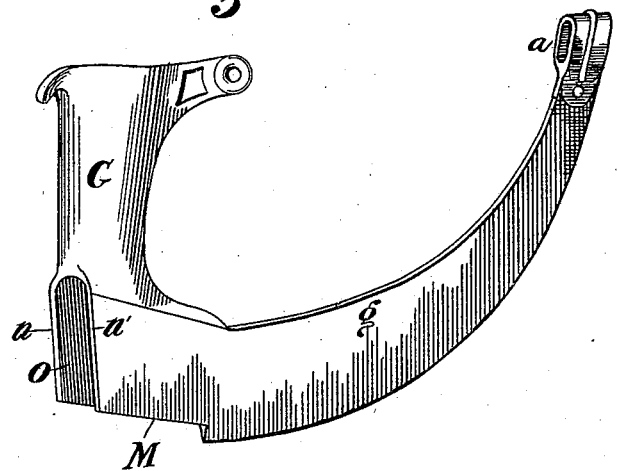
Figure 7:
Figure 8:

Figure 1 represents a central vertical section of my improvement attached to an ordinary grain-drill; Fig. 2, a top plan view of the drag-bar and detachable covering-shoe; Fig 3, a side elevation of the ordinary drag bar and hoe. Fig. 4 represents a side elevation of the detachable drag-bar; Fig. 5, a perspective view of an adjustable covering-plate attached to the heel of the shoe. Fig. 6 is a perspective view of the covering shoe and shank; Fig. 7, a bottom plan view of the same. Fig. 8 is a modified form of the covering-plate.

A represents the ground-wheels in an ordinary grain-drill; B B', the frame-work of the drill; C, the tongue; D, the seed-hopper; E, the ordinary drag-bar, which is preferably made with the forward end bifurcated, the forks $e$ $e$ being pivoted at their forward end to the frame B' of the drill.

In the use of a grain-drill some conditions of soil and of the land to be planted require different covering devices than other conditions. Where ground is trashy, it has been common to use shifting hoes to clear them of the accumulation of weeds and grass. Where soil is light and well prepared, the ordinary drill-hoe is best adapted to planting and covering the seed. Where trash—such as weeds, grass, straw, &c.—exists, or where the ground is lumpy, a cutting-colter such as shown in Fig. 1 plants the seed in a better manner than the ordinary hoe such as shown in Fig. 3. It is extremely desirable to so construct a grain-drill that the ordinary hoes may be used or the cutting-runners, as desired.

The object of my invention is to provide ready means for detaching the ordinary hoe from the ordinary drag-bar and substituting therefor the colter and covering-shoe. It is necessary to have the colter and covering-shoe so attached to the drag bar that it will operate in the same manner and be held firmly down to its work either by pressure or spring devices. To accomplish this I provide two points of attachment of the shoe to the drag-bar E.

G represents the shank of the shoe, and $g$ the cutting-colter portion.

$l$ represents the split covering-heel, which is formed by the two wings $n$ $n'$, attached to the colter-blade $g$, as shown in Figs. 6 and 7.

M represents a notch or sloping off of the wings $n$ $n'$ at the terminal point of the cutting-edge of colter $g$. The shape of this split heel is such that it will of itself cover the seed without the additional covering-plate, as shown in Figs. 1 and 2. It is essential to have the shank G and colter $g$ rigidly secured together and the shank G of such shape and proportion as to receive the seed-tubes of the ordinary grain-drill. The opening O at the rear of the split heel is important, as it allows the operator to observe the falling of the seed. These parts are so made as to be readily attached to and removed from the ordinary drag-bar.

$a$ represents a loop provided upon the forward end of the colter $g$, and adapted to slide easily and freely over the drag-bar E.

$b$ represents a detachable pin, which passes through the shank $c$ of the shoe G and secures the same to the rear end of the drag-bar E. A set-screw may be inserted through the loop $a$ to take up the lost motion of the same upon the drag-bar, if desired. It will be seen that the shoe G and the shank G and colter $g$ can be removed from off the drag-bar E by simply withdrawing the pin $b$ and the ordinary hoe H readily substituted therefor without changing any other portion of the drill. Thus I am enabled to use the most improved form of hoe and the most improved form of colter $g$ with the split covering-heel O, and rigidly attached to shank G upon the same drill, readily connecting or disconnecting either one of these covering devices by the removal of a single fastening device, $b$, to the ordinary drag-bar without change of any other parts of the drill.

Another feature of my invention relates to an improved mode of combining the detachable furrow-covering plate to the shank G.

I represents the cover-plate, which is provided with the slot $d$, pierced in its shank.

K represents a lug formed on the rear side of the shoe G.

$l$ represents a bolt passing through lug K and through the slot $d$ of the cover-plate, over which the slot $d$ of the covering-plate I engages. The slot allows the vertical adjustment of the plate I. This provides a very convenient means of adjusting the plate I to the point of shoe G, to cover the furrow and regulate the depth of the same. The shoe G is shown slightly elevated above the ground.

I have not deemed it necessary to show the devices for elevating the drag-bars C and their attached furrow-openers, as any ordinary lifting devices in common use may be used for that purpose. By rigidly securing shank G and colter $g$ with the split covering-heel O together, the same as if made of a single piece of metal, so as to remove these parts bodily and change the drill from a colter to a hoe-drill by substituting the ordinary hoe H, I secure important advantages: first, the drill is easily changed; second, the wearing of the hoes or colters does not affect the fitting of the parts which is the case with drills where it has been attempted to attach colters with the ordinary hoe H; third, I am enabled to use the thin wide colters $g$ with the split heel O, so as to more effectually cover the seed and cut the weeds and trash than has been accomplished by other devices hitherto used, making an improved furrow-opener. By making the lug K on the rear side of the shank G, I provide a stronger attaching device than has been hitherto employed, and is an improvement over that class of devices which pierces a hole through the shank itself and allows the covering-plate to be made of cast metal.

Heretofore the hoe of a grain-drill has been pivoted to the end of a drag-bar, and the lower end of the hoe attached between rear jaws of a shoe which is connected at its forward end with the drag-bar, and in another instance a spring-acting hoe connected with a drag-bar has been provided on its rear with a slotted adjustable gage-plate, the lower end of which is bent rearwardly to travel on the surface of the ground. Such features are not, therefore, broadly claimed by me.

I claim—

1. In a seeding-machine, the colter $g$, with the split covering-heel O, secured to the hoe-shank G, the parts being rigidly connected together and adapted to be attached to the ordinary drag-bar of a grain-drill which is hinged to the main frame, substantially as specified.

2. In a seeding-machine, the drag-bar E, hinged to the main frame of the drill, and adapted to be connected interchangeably with the combined shank G, colter $g$, having the split covering-heel, and to the detachable hoe H, whereby the drill may be readily converted from a hoe to a runner-drill, substantially as specified.

3. In combination with the colter $g$, having the split covering-heel O, shank G, provided with lug K, the adjustable covering-plate I, with its slotted shank $l$, secured to the lug K, substantially as specified.

In testimony whereof I have hereunto set my hand.

ANDREW RUNSTETLER.

Witnesses:
J. F. CAMPBELL,
HARRY H. PRUGH.